United States Patent
Molchadsky

(10) Patent No.: US 11,545,831 B1
(45) Date of Patent: Jan. 3, 2023

(54) SYSTEMS AND METHODS FOR MAXIMIZING SOLAR ENERGY USAGE AND OPTIMIZING NON-RENEWABLE ENERGY SOURCES

(71) Applicant: GALOOLI LTD., Tel Aviv (IL)

(72) Inventor: Itamar Molchadsky, Sede Warburg (IL)

(73) Assignee: GALOOLI LTD.

( * ) Notice: Subject to any disclaimer, the term of this patent is extended or adjusted under 35 U.S.C. 154(b) by 0 days.

(21) Appl. No.: 17/859,087

(22) Filed: Jul. 7, 2022

Related U.S. Application Data

(60) Provisional application No. 63/219,654, filed on Jul. 8, 2021.

(51) Int. Cl.
| | |
|---|---|
| H02J 3/00 | (2006.01) |
| H02J 3/38 | (2006.01) |
| H02J 7/00 | (2006.01) |
| H02J 3/32 | (2006.01) |

(52) U.S. Cl.
CPC ............. H02J 3/004 (2020.01); H02J 3/32 (2013.01); H02J 3/381 (2013.01); H02J 7/0048 (2020.01); *H02J 2300/22* (2020.01)

(58) Field of Classification Search
CPC .... H02J 3/004; H02J 3/32; H02J 3/381; H02J 7/0048; H02J 2300/22
See application file for complete search history.

(56) References Cited

U.S. PATENT DOCUMENTS

| | | | |
|---|---|---|---|
| 2005/0062289 A1* | 3/2005 | Cho | H02J 3/28 |
| | | | 290/2 |
| 2009/0066258 A1* | 3/2009 | Cleland | H05B 41/40 |
| | | | 315/158 |
| 2009/0319090 A1 | 12/2009 | Dillon et al. | |
| 2011/0062913 A1 | 3/2011 | Lin et al. | |
| 2011/0260470 A1 | 10/2011 | Ahmadi | |
| 2014/0231284 A1 | 8/2014 | Ansari | |
| 2014/0277599 A1 | 9/2014 | Pande et al. | |
| 2014/0285005 A1 | 9/2014 | Casteel | |
| 2016/0286627 A1* | 9/2016 | Chen | H05B 47/19 |

(Continued)

FOREIGN PATENT DOCUMENTS

| | | |
|---|---|---|
| GB | 2429343 | 2/2007 |
| WO | WO 2006/132760 | 12/2006 |

(Continued)

OTHER PUBLICATIONS

International Search Report of Application No. PCT/IL2022/050738 dated Oct. 6, 2022.

*Primary Examiner* — Ziaul Karim
(74) *Attorney, Agent, or Firm* — Pearl Cohen Zedek Latzer Baratz LLP

(57) ABSTRACT

A system and method for optimizing utilization of a plurality of energy sources of a power site are provided. The optimization can involve receiving a weather forecast and expected power output for a predefined time duration, and a power source for one or more time intervals to provide output power for the power site. The determination can be based on a future weather forecast and expected power output. The optimization can involve minimizing an amount of time that generator(s) are the power source and maximizing an amount of time that solar panel(s) are the power source.

12 Claims, 4 Drawing Sheets

(56) References Cited

U.S. PATENT DOCUMENTS

| | | | | |
|---|---|---|---|---|
| 2016/0286629 | A1* | 9/2016 | Chen | H05B 47/19 |
| 2020/0127604 | A1* | 4/2020 | Kosharovsky | H02S 50/00 |
| 2020/0328599 | A1* | 10/2020 | Brombach | H02J 13/00002 |
| 2022/0260973 | A1* | 8/2022 | Swank | G05B 19/4184 |

FOREIGN PATENT DOCUMENTS

| | | |
|---|---|---|
| WO | WO 2009/045349 | 4/2009 |
| WO | WO 2014/092821 | 6/2014 |

* cited by examiner

SYSTEMS AND METHODS FOR MAXIMIZING SOLAR ENERGY USAGE AND OPTIMIZING NON-RENEWABLE ENERGY SOURCES

FIELD OF THE INVENTION

The invention relates generally to the field of energy management at power sites (e.g., grid-connected power sites, hybrid power sites, and/or microgrids). In particular, the invention relates to maximizing solar energy usage, and optimizing a plurality of energy sources of power sites, including monitoring, scheduling and managing connected and hybrid power sources.

BACKGROUND OF THE INVENTION

In developing countries, underdeveloped countries, rural and/or distant areas, electricity grids can be inconsistent and/or unreliable. Interruptions to electricity supply can also occur in developed and/or densely populated areas. Electric supply interruptions can cause direct and/or indirect operational damage to electricity and telecom providers and/or consumers. Power sites can rely on different types of energy sources to backup and/or complete each other: electricity grid, rechargeable batteries, generators, solar and/or wind energy.

Diesel and fuel-based generators can typically be used on power sites to charge batteries once they reach or dropped below a predetermined threshold. When sunshine is abundant around a power site, solar energy can replace the generators in charging the batteries. Simultaneous activity of generators and/or solar panels can cause a waste of energy and increase of operational costs. Waste can also occur when batteries' charging process continues to take place when the batteries are actually fully charged, e.g., accelerating battery degradation, harm battery health, and/or shorten battery life. Energy waste can also increase greenhouse gas emissions such as Carbon Dioxide ($CO_2$), which can cause adverse environmental effects. Energy waste can also result in increased operational expenditures for sites-operators, who may be penalized, either directly or indirectly, for exceeding various environmental, social, and governance (ESG) standards.

Currently, some systems schedule operation of energy sources at power sites, however, scheduling typically accounts neither for real-time-conditions and circumstances, nor to future ones, which can change the optimal power source for a power site in a given moment, thus causing waste to occur. More specifically, current systems typically do not account for future predictions of solar energy to rely upon, or to how much power a particular site consumes and/or how much load solar panels can support under varying circumstances and/or conditions. Therefore, it is possible that a power site uses a generator during dark time to charge batteries up to a fixed-high level of charge (e.g. 85%)—in some scenarios even to the maximum State of Charge (SOC) level—just before sunrise, or just before solar energy can push the process forward, and complete it, in a more cost-effective, and non-polluting way. Thus, when the sun comes up, the battery either requires no extra charging, or can be charged to a maximum level in a very short period time. This may also cause the battery to be overcharged within a very short period of time.

Therefore, it can be desirable to optimize utilization of energy sources of a power site.

SUMMARY OF THE INVENTION

One advantage of the invention can include saving energy in a power site. Another advantage of the invention can include strategic scheduling that can minimize an amount of power supplied by a generator and/or maximize an amount of power supplied by a solar power source. Another advantage of the invention can include preventing simultaneous charging of batteries by generators and a solar power source. Another advantage of the invention can include, saving battery life of battery power sources in a power site. Another advantage of the invention can include, not over charging or under charging the battery. Another advantage of the invention can include, maximizing use of solar energy. Another advantage of the invention can include dynamically modifying the power source in real-time to account for current and/or future conditions, including load, and weather.

Another advantage of the invention is the reduction of greenhouse emissions.

In one aspect, the invention involves a method for optimizing utilization of a plurality of energy sources of a power site. The method can involve receiving, by a computing device, a plurality of power site specific parameters including weather forecast, a state of charge of a battery at the power site and expected power output for a predefined time duration. The method can involve determining, by the computer device, for the predefined time duration, a first time interval where a solar panel is to provide power to the battery based on the weather forecast, the state of charge of the battery and expected power output. The method can involve updating, by the computer device, in real-time during the predefined time duration, an actual energy source of the plurality of energy sources to be the solar panel provide the output power for the power site during the at least one-time interval based on current and future weather and current and future requests for power output of the power site.

In some embodiments, the method can also involve determining, by the computing device, for the predefined time duration, a second time interval, a third time interval and a fourth time interval, each having one of a plurality of energy sources to provide output power for the power site, the one of the plurality of energy sources is based on the weather forecast, the state of charge of the battery and the expected power output, wherein the second time interval is an end of daylight hours, the third time interval is nighttime, and the fourth time interval is a transition between nighttime and daylight and updating, by the computer device, in real-time during the predefined time duration, an actual energy source of the plurality of energy sources to provide the output power for the power site based on current and future weather and current and future requests for power output of the power site.

In some embodiments, determining the second time interval, the third time interval and the fourth time interval is further based on maximizing an amount of solar power output usage by the power site. In some embodiments, the plurality of energy sources comprises a generator. In some embodiments, the determination of the third time interval further comprises determining a minimal amount of for a state of charge for the battery and setting the generator such that it provides only enough power to reach that minimal amount.

In some embodiments, determining the first time interval is further based on minimizing an amount of time a generator is used by the power site.

In another aspect, the invention involves a method for optimizing utilization of a plurality of energy sources of a power site. The method can involve receiving, by a computing device, a plurality of power site specific parameters including weather forecast, a state of charge of a battery at the power site and expected power output for a predefined time duration. The method can also involve determining, by the computing device, for the predefined time duration, a first time, a second time interval, a third time interval and a fourth time interval, each having one of a plurality of energy sources to provide output power for the power site, the one of the plurality of energy sources is based on the weather forecast, the state of charge of the battery and the expected power output, wherein the first time interval is when a solar panel is to provide power to the battery, the second time interval is an end of daylight hours, the third time interval is nighttime, and the fourth time interval is a transition between nighttime and daylight, and wherein the third time interval is based on minimizing an amount of time a generator powers the battery. The method can also involve updating, by the computer device, in real-time during the predefined time duration, an actual energy source of the plurality of energy sources to provide the output power for the power site based on current and future weather and current and future requests for power output of the power site.

In another aspect, the invention involves a method for optimizing utilization of a plurality of energy sources of a power site. The method can involve receiving, by a computing device, a plurality of power site specific parameters including weather forecast, a state of charge of a battery at the power site and expected power output for a predefined time duration. The method can involve determining, by the computing device, for the predefined time duration, a first time, a second time interval, a third time interval and a fourth time interval, each having one of a plurality of energy sources to provide output power for the power site, the one of the plurality of energy sources is based on the weather forecast, the state of charge of the battery and the expected power output, wherein the first time interval is when a solar panel is to provide power to the battery, the second time interval is an end of daylight hours, the third time interval is nighttime, and the fourth time interval is a transition between nighttime and daylight, and wherein one or more solar panels and one or more generators provide power to the battery different times. The method can also involve updating, by the computer device, in real-time during the predefined time duration, an actual energy source of the plurality of energy sources to provide the output power for the power site based on current and future weather and current and future requests for power output of the power site.

In another aspect, the invention involves a method for optimizing utilization of a plurality of energy sources of a power site. The method can involve i) receiving, by a computing device, a plurality of power site specific parameters including weather forecast, a state of charge of a battery at the power site and expected power output for a predefined time duration. The method can also involve ii) determining, by the computing device, for the predefined time duration, a first time, a second time interval, a third time interval and a fourth time interval, each having one of a plurality of energy sources to provide output power for the power site, the one of the plurality of energy sources is based on the weather forecast, the state of charge of the battery and the expected power output, wherein the first time interval is when a solar panel is to provide power to the battery, the second time interval is an end of daylight hours, the third time interval is nighttime, and the fourth time interval is a transition between nighttime and daylight. The method can also involve iii) updating, by the computer device, in real-time during the predefined time duration, an actual energy source of the plurality of energy sources to provide the output power for the power site based on current and future weather and current and future requests for power output of the power site. The method can also involve repeating steps ii) and iii) for a subsequent predefined time duration such that each time steps ii) and iii) are repeated, the determination of step ii) is further localized to the power site.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

In general, the invention can involve optimizing utilization of a plurality of energy sources of a power site. The optimization can be performed to provide output energy such that solar energy is maximally used while generator energy is minimally used based on predictive factors.

Figure 1:
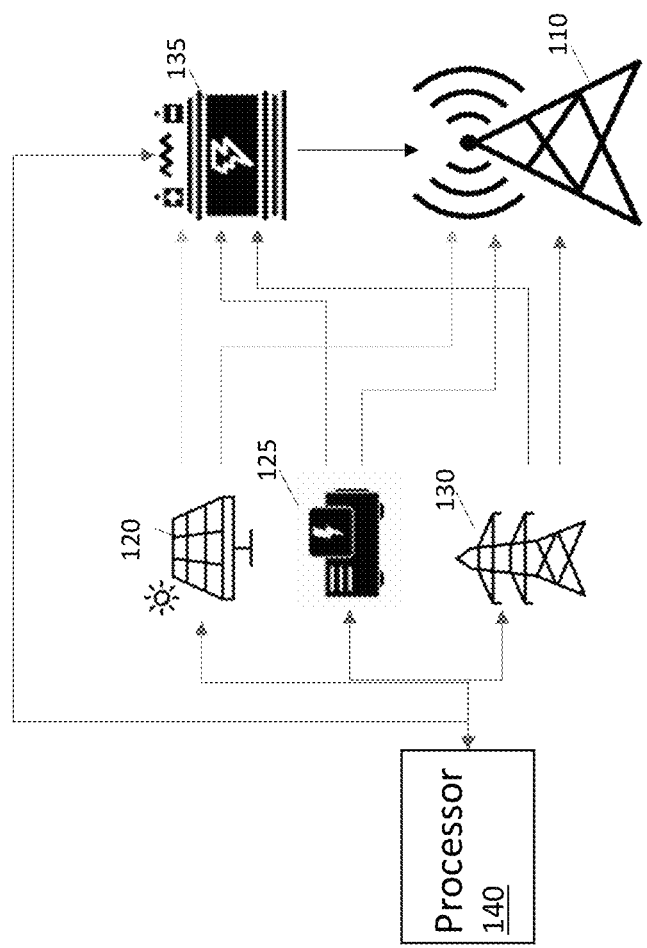
FIG. 1 schematically illustrates an example of a power site for a load, according to some embodiments of the invention.

FIG. 1 schematically illustrates an example of a power site 100 for a load 110, according to some embodiments of the invention. The power site can be grid-connected power sites, hybrid power sites, and/or microgrids.

The power site 100 includes a plurality of energy sources of a solar power source 120, a generator 125, an electric grid 130, a rechargeable battery 135, and a processor 140. The solar power source 120, the generator 125, and the electric grid 130 can each be connected to (e.g., via a wired connection) the rechargeable battery 135 and the load 110.

The processor 140 can be connected to the solar power source 120, the generator 125, the electric grid 130 and the battery 135.

In the example of FIG. 1 the load 110 is a cellular antenna.

In various embodiments, there can be more or less energy sources. In some embodiments, the solar power source 120 is a solar panel.

In some embodiments, there are multiple loads. For example, there can be multiple transmit/receive antennas.

The power site 100 can be for renewable energy, a microgrid, a fleet of electric vehicles, a data center, telecommunications and/or any other facility.

During operation, the solar power source 120, the generator 125 and the electric grid 130 can each charge the rechargeable battery 135 and/or provide power directly to the load 110. The processor 140 can determine which of the energy sources provide power to the rechargeable battery 135 and/or the load 110. The processor 140 can determine an advance schedule for the energy sources and modify the schedule dynamically in real-time, as described in further detail below with respect to FIG. 2.

The processor 140 can be one computing device or multiple computing devices. The processor can be wired or wirelessly, and/or can be coupled to one or more databases and/or the internet. The processor 140 can also be coupled to input devices, e.g., as described in further detail below with respect to FIG. 4.

Figure 2:
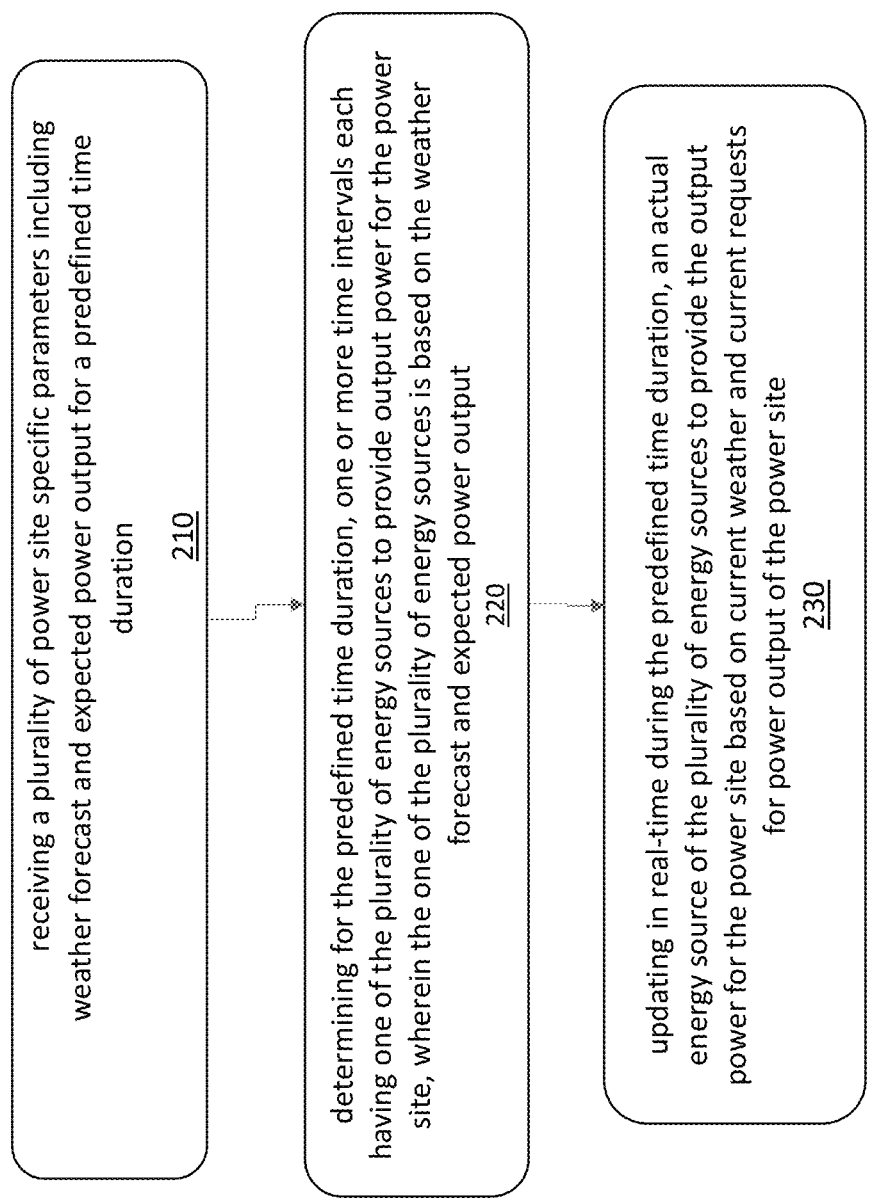
FIG. 2 shows a flow chart for a method for optimizing utilization of a plurality of energy sources of a power site, according to some embodiments of the invention.

FIG. 2 shows a flow chart for a method 200 for optimizing utilization of a plurality of energy sources of a power site (e.g., energy sources and power site as described above in FIG. 1), according to some embodiments of the invention.

The method involves receiving (e.g., by the processor 140, as described above in FIG. 1) a plurality of power site specific parameters including weather forecast and expected power output and load for a predefined time duration (Step 210).

The predefined time duration can be input by a user. The predefined time duration can be a 24 hour period, a 48 hour period, or a week long period. The predefined time duration can be any time interval.

The weather forecast (e.g., atmospheric conditions) can include temperature, humidity, precipitation, wind speed, wind direction, air pressure, clouds, or any combination thereof.

In some embodiments, the power site specific parameters can include visibility level.

In some embodiments, the power site specific parameters can be received for past durations (e.g., prior days, parts of the day, months and/or years) of a particular location that the power site is located. The power site specific parameters for past durations can be used to predict expected current and/or future weather conditions for the power site. The power site specific parameters for past durations can be used to train one or more machine learning models (e.g., models created via a convolutional neural network and/or other machine learning models as are known in the art).

The one or more machine learning models can be used to determine expected weather conditions along with a weather forecast for the power site. The determination can begin in a particular region based on the location of the power site and continue to be refined within the particular region with power site specific data (e.g., times that the solar is on and off), such that the determination can become more and more accurate with respect to the location of the power site.

The weather forecast can be based on the weather history of a previous time period. The previous time period can be dynamic such that any duration of data that is processable by the computing device executing the method can be received to, for example, increase accuracy.

In some embodiments, the weather forecast is based on the weather history of a previous time period. The previous time period can be defined by a user. The previous time period can be, for example, three days.

The power site specific parameters can also include parameters related to the energy sources and the load. Each energy source can have associated parameters. For example, each energy source can have a maximum output power. A solar panel can have size of the solar panel, a time duration to charge to a maximum charge state, and time to discharge. A generator can have a size of the generator, maximum output power and a time to discharge. An electric grid can have a maximum output power and a time to discharge. A battery can have a maximum State of Charge (SOC) and a minimum State of Charge (SOC).

The expected power output for the predefined duration can be based on historical data. The historical data can be input by a user, collected over time by the system or any combination thereof.

The historical data can be power consumed by the load for past durations (e.g., prior days, months and/or years) of the power site. The expected output power can be based on models trained via machine learning models (e.g., models trained via a neural network).

The expected output power can continually be updated. For example, the expected output power can be updated every 5 minutes, such that a twenty four hour period is broken into 288 slots. In various embodiments, the output power is updated at other time intervals. In some embodiments, the historical data can be limited to a predefined look back period (e.g., 1 week, 4 months, 1 year, 3 years, 5 years). In some embodiments, limiting the predefined look back period can allow a more accurate expected output power for power sites that have had a significant change in the past year in usage. For example, for a power site in sparsely populated area that in the past year has become densely populated, it can be beneficial to limit the lookback period to a time period of power site usage where the densely populated condition has occurred, so that the sparsely populated condition output power consumption in the past has little influence over a models expected power output prediction.

In some embodiments, the load is multiple devices. For example, servers in a data center or vehicles in a fleet of electric vehicles. In these embodiments, the expected output power is determined to provide power to each of the multiple devices.

The method can also involve determining, by the computer device, for the predefined time duration, one or more time intervals each having one of the plurality of energy sources to provide output power for the power site, wherein the one of the plurality of energy sources is based on the weather forecast and expected power output (Step 220).

The particular energy source of the plurality of energy sources selected for a particular time interval can be determined to maximize an amount of solar power that is output by the power site. Maximizing the amount of solar power that is output by the power site seeks to minimize an amount of generator power and/or electric grid power that is output, thus minimizing the amount of non-renewable, non-green energy the power site supplies to the load. Supplying renewable and green energy to the load can reduce overall cost of supply power, minimize impact to the environment, and/or extend lifetime of other non-renewable energy sources.

The plurality of energy sources can include one or more solar panels, batteries, generators and/or electric grids.

In some embodiments, the particular energy source of the plurality of energy sources selected for a particular time interval is based on an order of preference for energy sources to power the load. The order of preference can be based on ensuring the solar panel is used a maximum amount of time while the generator and/or battery are used a minimum amount of time. The order of preference can be first: solar panel first, second: battery, third: generator.

In some embodiments, the solar panel and the generator charge the battery, and the battery powers the load. In these embodiments, an order of preference between the solar panel and the generator can be determined. In these embodiments, the order of preference between the solar panel and the generator can be based on ensuring the solar panel is used a maximum amount of time while the generator and/or battery is used a minimum amount of time. The solar panel can charge the battery during a time duration when the sun is present and the generator (or electric grid or other non-solar energy source) can charge the battery during durations when the sun is not present.

The generator and the solar panel (e.g., and/or other non-renewable energy sources) can be scheduled based on the predicted weather forecast and expected output power (e.g., the expected power consumption of the load). The generators can be the Perkins 400 Series.

Other generator manufacturers could be Lister Petter, FG Wilson, Olympian, and/or others.

In some embodiments, the plurality of energy sources are scheduled during the time interval based on a SOC of the battery. For example, the solar panel can be scheduled to provide power to the battery based on a capacity of the battery. For a larger battery, it can take a longer duration to charge the battery, and for a smaller battery it can take a shorter duration to charge the battery.

In some embodiments, the solar panel is scheduled based on a 24 hour period, predicted sun duration, and battery capacity.

Four durations can be determined, a first duration of invalid, a second duration of pre-target, a third duration of post-target, and fourth duration of target.

The invalid duration is a time period where the solar panel is to power the battery and thus power the power site (e.g., a time period for which the generator is deemed invalid to use). This is the time period where it is sunny. In some embodiments, the solar panel can turn on and off during the invalid duration based on the SOC of the battery. For example, if the SOC of the battery is such that the battery is charged in less time than the invalid duration, the solar panel can fully charge the battery and then wait until the battery is discharged before charging the battery again. For example, assume an invalid duration that starts at 8 am, when a SOC of the battery is 60%, if a sun level is high and amount of consumption is low, this can result in a higher state of battery charge, for example, 80% at 10 am. In this example, the solar panel can be shut down until some of the charge is used. As is apparent to one of ordinary skill in the art, this is presented for example purposes only and that for varying invalid durations, SOC of the battery, and loads the outcomes can be different.

Once the second duration of pre-target is reached, e.g., at the end of daylight, the solar panel can shut down, and the battery can provide power to the load without being recharged by the solar panel.

Once the third duration of target duration is reached, e.g., during the night, there is no sun for the solar panel to convert into energy, and thus generator (e.g., and/or an alternative energy source) can recharge the battery. The amount of charge for the generator to provide the battery can be based on determining the minimal amount required for the battery's SOC at the beginning of the post-target duration to, for example, put the battery in an optimal charge state for the start of the post-target duration. The SOC percentage can change in order to, for example, 1) minimize generator use, 2) make the best out of future solar power, and/or 3) prevent overcharging and keep the battery in good health.

Once the fourth duration of post-target is reached, e.g., the transition from night to day, the generator (e.g., and/or alternative energy source) can continue to recharge the battery for a duration until solar can take over. A determination as to how much charge to provide to the battery until the solar panel can start to recharge the battery (e.g., the invalid period restarted) can be made. The determination can minimize the amount of charge the generator provides to the battery. This is typically a time duration when the sun has started coming up but not yet in a position to provide a strong enough charge. An amount of charge to provide to the battery until the solar panel can start to recharge the battery can be based on preventing the generator from overcharging the battery in view of the upcoming invalid period.

As described above, the first, second, third and fourth duration can be scheduled based on the weather forecast, prior weather, current and expected power demand, battery SOC, and/or any combination thereof.

In some embodiments, for durations that the generator is running a simulation is performed every minute that determines for a set of predefined durations if the generator is used to charge the battery, how long the battery can last to power the load. For example, a set of predefined durations can be 5, 10, 15, and 20 minutes. The simulation can be run to determine if the generator is turned on to power the battery for 5, 10, 15 and 20 minutes, how long the battery can last to power the load. In this manner an optimal time duration to run the generator for a duration that provides enough power to the load and avoids wasting generator resource can be determined.

In some embodiments, the simulation performed for the generator is performed for other energy sources (e.g., the electric grid).

In some scenarios, actual weather and/or actual power demand varies during operation from the weather forecast and/or expected power demand, respectively. Therefore, it can be desirable to modify whether solar power, generator and/or other energy sources are used to power the battery and/or provide power to the load in real-time.

The method can also involve updating, by the computer device, in real-time during the predefined time duration, an actual energy source of the plurality of energy sources to provide the output power for the power site based on current weather and current requests for power output of the power site (Step 230).

For example, if the weather forecast predicted sun, and clouds prevent the sun from allowing the solar panels to charge the battery, if for the current predetermined duration the energy source was a solar panel, the actual energy source can be switched to be the generator.

In some embodiments, during each time interval, the current weather, current power demand from the load, and current battery capacity can be assessed on a periodic basis to update the energy source selected for a particular time interval in real-time.

Figure 3:
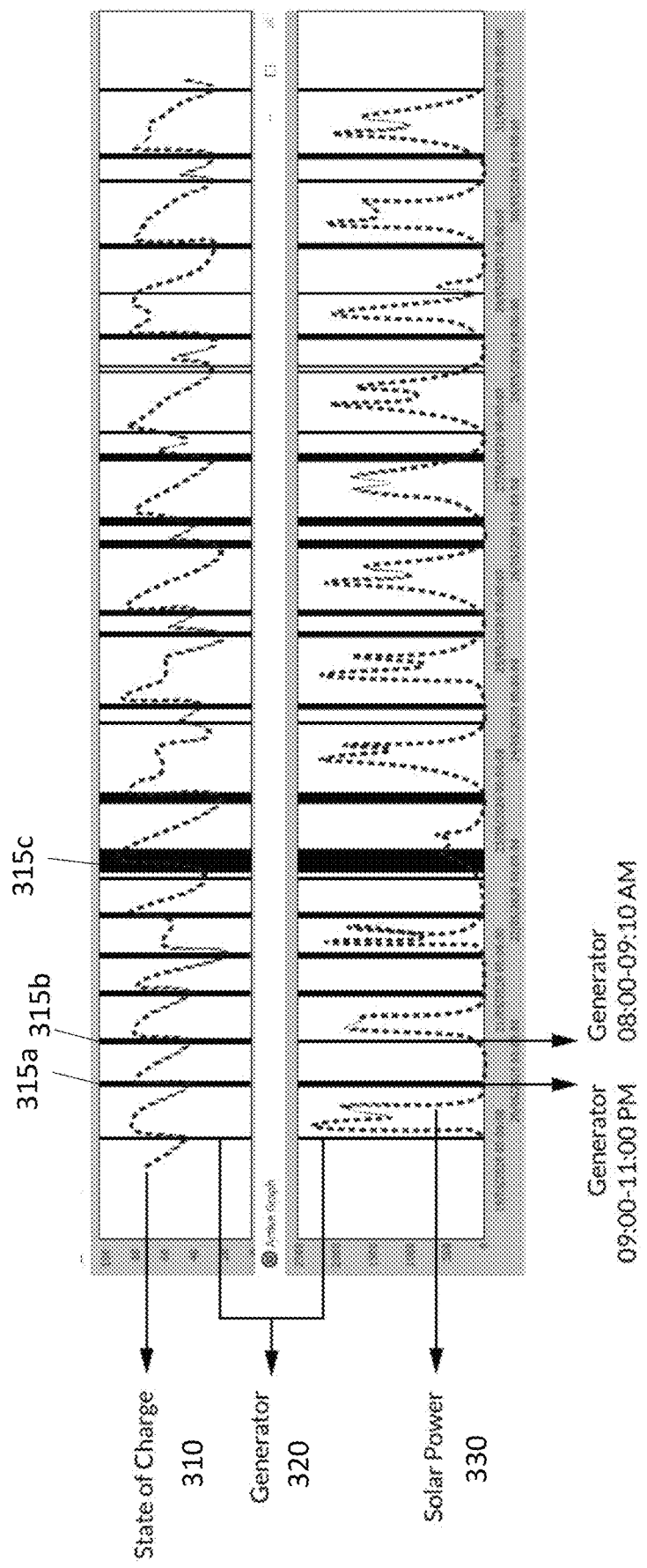
FIG. 3 is an example of a plot showing an example of power provided to a load for a plurality of energy sources over time, according to some embodiments of the invention.

FIG. 3 is an example of a plot showing an example of power provided to a battery for a plurality of energy sources over time, according to some embodiments of the invention. As the power provided by a plurality of energy sources as shown in FIG. 3 can be determined by the method as described above. In this example, the SOC of a battery can be seen in line 310. In this example, the maximum SOC is set to ~90% and the minimum SOC is set to ~20%.

The solar power is on according to the waveform 330 as shown. The generator is on at each interval as shown by a shaded block, for example, blocks 315a, 315b, and 315c. For example, at block 315a, the generator 320 is shown as charging the battery from 9:00 pm-11:00 pm, at block 315b the generator 320 is shown as charging the battery from 8:00 am-9:10 am. As can be seen in this example, the generator 320 is typically not on at the same time that the solar power waveform 330 is increasing and/or high. This can be to ensure that the generator 320 is used as little as possible, for example, when the SOC reaches and/or is approaching its minimum threshold and solar power waveform 330 (e.g., available solar power) is decreasing, insufficient and/or not available. Each time the solar power waveform 330 decreases to the minimal SOC that is set to ~20, the generator 320 is shown as being on. Each time the solar power waveform 330 increases the SOC 310 of the battery increases, each time the solar power waveform 330 decreases, the SOC 310 of the battery decreases. Each time the generator 320 is on, the SOC 310 of the battery rises. In other locations, the SOC of the battery rises due to solar power being on. For example, at increase, the generator 320 is not on, but the state of charge of the battery is still rising, thus solar energy, and not the generator is charging the battery.

Figure 4:
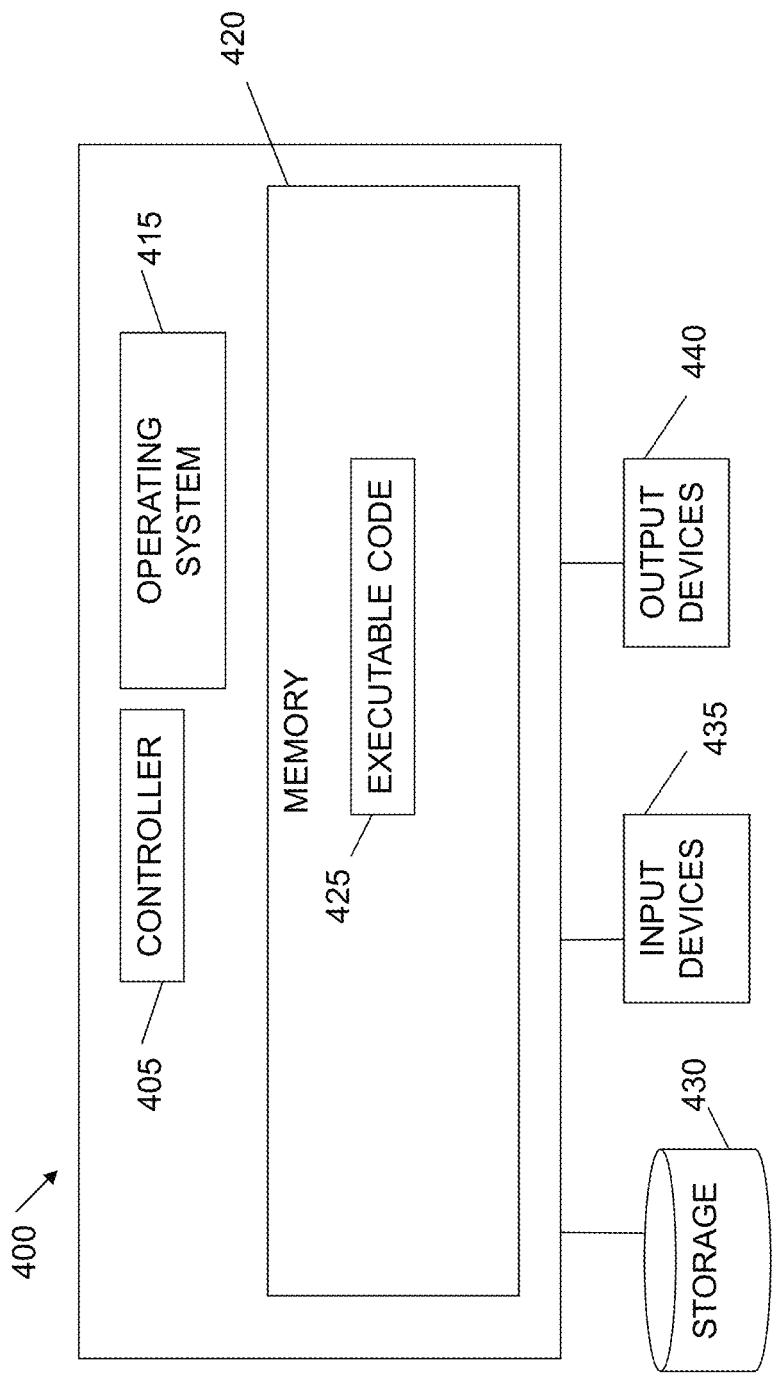
FIG. 4 shows a block diagram of a computing device which can be used with embodiments of the invention. It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of possibly different memory units. Memory 420 can store for example, instructions to carry out a method (e.g., code 425), and/or data such as user responses, interruptions, etc. At least a portion of Memory 420 can be housed on the cloud.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used and can be connected to a network and used as a system. One or more controllers (e.g., processor(s)) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 4 can be omitted. Storage 430 may include cloud storage. Storage 430 may include storing in a database.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (MC), a modem, printer or facsimile machine, a universal serial bus (USB) device or external hard drive can be included in input devices 435 and/or output devices 440.

Embodiments of the invention can include one or more article(s) (e.g., memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry. In some embodiments, at least a portion of the memory is housed online on the cloud.

To provide for interaction with a user, the above-described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random-access memory (RANI) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above-described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments, the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for optimizing utilization of a plurality of energy sources of a power site, the method comprising:
    receiving, by a computing device, a plurality of power site specific parameters including weather forecast, a state of charge of a battery at the power site and expected power output for a predefined time duration;
    determining, by the computer device, for the predefined time duration, a first time interval where a solar panel is to provide power to the battery based on the weather forecast, the state of charge of the battery and expected power output;
    updating, by the computer device, in real-time during the predefined time duration, an actual energy source of the plurality of energy sources to be the solar panel provide the output power for the power site during the at least one-time interval based on current and future weather and current and future requests for power output of the power site;
    determining, by the computing device, for the predefined time duration, a second time interval, a third time interval and a fourth time interval, each having one of a plurality of energy sources to provide output power for the power site, the one of the plurality of energy sources is based on the weather forecast, the state of charge of the battery and the expected power output, wherein the second time interval is an end of daylight hours, the third time interval is nighttime, and the fourth time interval is a transition between nighttime and daylight, and wherein the determination of the third time interval further comprises determining a minimal amount of for a state of charge for the battery and setting the generator such that it provides only enough power to reach that minimal amount; and
    updating, by the computer device, in real-time during the predefined time duration, an actual energy source of the plurality of energy sources to provide the output power for the power site based on current and future weather and current and future requests for power output of the power site.

2. The method of claim 1 wherein determining the second time interval, the third time interval and the fourth time interval is further based on maximizing an amount of solar power output usage by the power site.

3. The method of claim 1 wherein the plurality of energy sources comprises a generator.

4. The method of claim 1 wherein determining the first time interval is further based on minimizing an amount of time a generator is used by the power site.

5. A system for optimizing utilization of a plurality of energy sources of a power site, the system comprising:
    a processor configured to:
    receive a plurality of power site specific parameters including weather forecast, a state of charge of a battery at the power site and expected power output for a predefined time duration;
    determine for the predefined time duration, a first time interval where a solar panel is to provide power to the battery based on the weather forecast, the state of charge of the battery and expected power output;

update in real-time during the predefined time duration, an actual energy source of the plurality of energy sources to be the solar panel provide the output power for the power site during the at least one-time interval based on current and future weather and current and future requests for power output of the power site;

determine for the predefined time duration, a second time interval, a third time interval and a fourth time interval, each having one of a plurality of energy sources to provide output power for the power site, the one of the plurality of energy sources is based on the weather forecast, the state of charge of the battery and the expected power output, wherein the second time interval is an end of daylight hours, the third time interval is nighttime, and the fourth time interval is a transition between nighttime and daylight, and wherein the determination of the third time interval further comprises determining a minimal amount of for a state of charge for the battery and setting the generator such that it provides only enough power to reach that minimal amount; and update in real-time during the predefined time duration, an actual energy source of the plurality of energy sources to provide the output power for the power site based on current and future weather and current and future requests for power output of the power site.

6. The system of claim 5 wherein determining the second time interval, the third time interval and the fourth time interval is further based on maximizing an amount of solar power output usage by the power site.

7. The system of claim 5 wherein the plurality of energy sources comprises a generator.

8. The system of claim 5 wherein determining the first time interval is further based on minimizing an amount of time a generator is used by the power site.

9. A non-transitory computer program product comprising instruction which, when the program is executed cause the computer to:

receive a plurality of power site specific parameters including weather forecast, a state of charge of a battery at the power site and expected power output for a predefined time duration;

determine for the predefined time duration, a first time interval where a solar panel is to provide power to the battery based on the weather forecast, the state of charge of the battery and expected power output;

update in real-time during the predefined time duration, an actual energy source of a plurality of energy sources to be the solar panel to provide the output power for a power site during the at least one-time interval based on current and future weather and current and future requests for power output of the power site;

determine for the predefined time duration, a second time interval, a third time interval and a fourth time interval, each having one of a plurality of energy sources to provide output power for the power site, the one of the plurality of energy sources is based on the weather forecast, the state of charge of the battery and the expected power output, wherein the second time interval is an end of daylight hours, the third time interval is nighttime, and the fourth time interval is a transition between nighttime and daylight, and wherein the determination of the third time interval further comprises determining a minimal amount of for a state of charge for the battery and setting the generator such that it provides only enough power to reach that minimal amount; and update in real-time during the predefined time duration, an actual energy source of the plurality of energy sources to provide the output power for the power site based on current and future weather and current and future requests for power output of the power site.

10. The non-transitory computer program product of claim 9 wherein determining the second time interval, the third time interval and the fourth time interval is further based on maximizing an amount of solar power output usage by the power site.

11. The non-transitory computer program product of claim 9 wherein the plurality of energy sources comprises a generator.

12. The non-transitory computer program product of claim 9 wherein determining the first time interval is further based on minimizing an amount of time a generator is used by the power site.

* * * * *